Patented Aug. 25, 1953

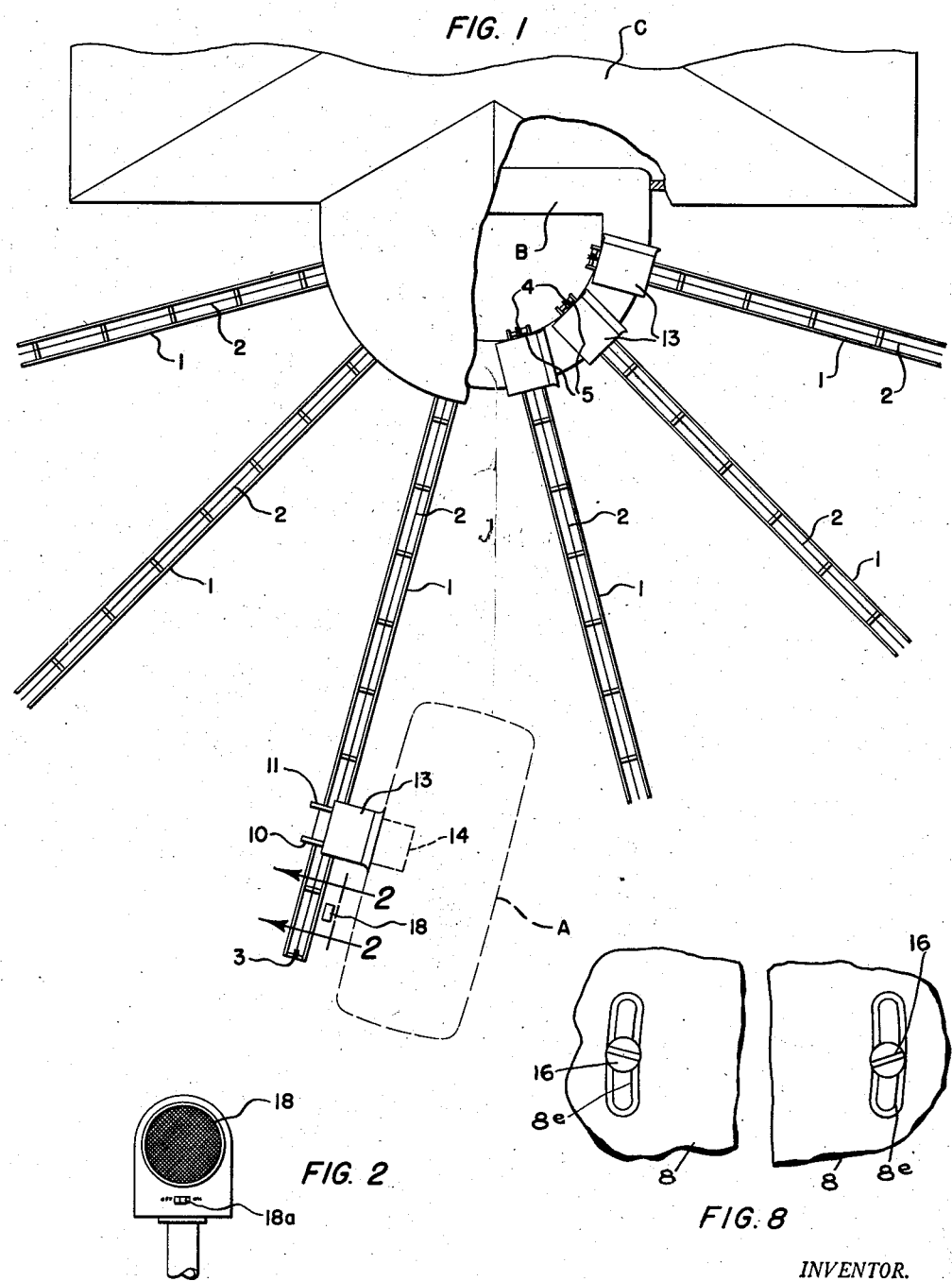

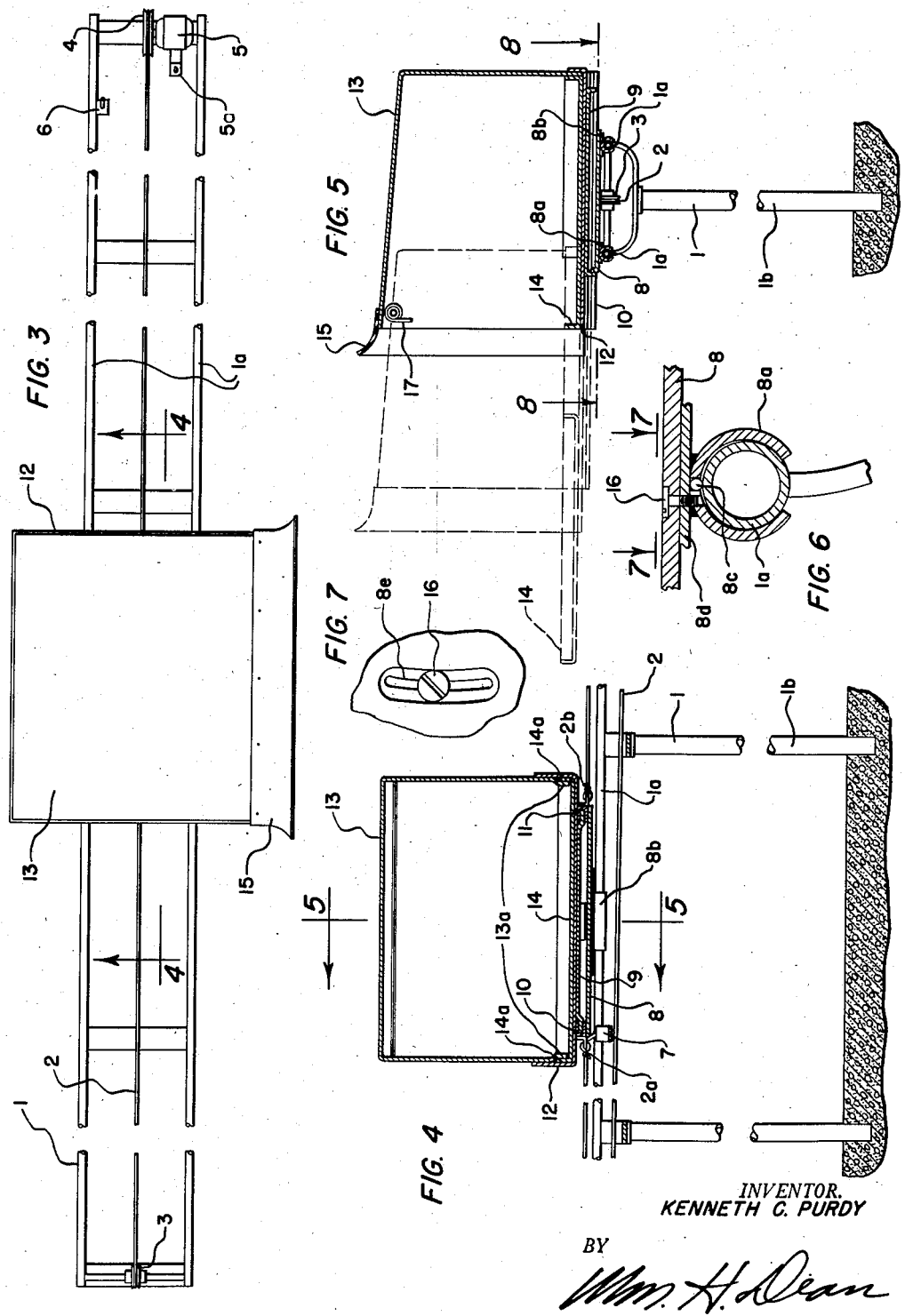

2,649,930

UNITED STATES PATENT OFFICE 2,649,930

MEANS FOR MARKETING GOODS

Kenneth C. Purdy, Vista, Calif.

Application July 2, 1948, Serial No. 36,583

5 Claims. (Cl. 186—1)

My invention relates to a means for marketing goods, more particularly for use in mechanically delivering goods to the occupants of motor vehicles in a parking lot adjacent a retail place of business, and the objects of my invention are:

First, to provide a means of this class in which a mechanical conveyor motivates a hooded tray into adjacent relationship with an automobile, whereby the occupants of the vehicle may extend the hooded tray laterally of the track into contiguous relationship with the side of the vehicle and thereinto, for unloading the tray in a convenient manner;

Second, to provide a means of this class which fully protects articles purchased during transit from the service counter of the retail business establishment to the interior of a motor vehicle standing in a parking lot outwardly of the place of business;

Third, to provide a means of this class in which a hooded tray is conveyed longitudinally of a track and then moved laterally in contiguous relationship with the side of a motor vehicle, whereby weather-stripping on the hooded tray seals the same against weather surrounding the window of the vehicle, so that unloading of the tray internally of the vehicle by the occupants is protected from the elements during bad weather;

Fourth, to provide a means of this class having a traveling hooded tray which is enclosed on the top and three sides by permanent structure, and enclosed on the remaining side by a retractible curtain, which may be released and moved out of interference with the articles within the hooded tray after the tray has been moved laterally of the track on which it travels and into contiguous relationship with the window frame of a conventional motor vehicle;

Fifth, to provide a means of this class in which a traveling hooded tray is movable laterally into contiguous relationship with a motor vehicle, and provided with an additional sliding tray extension which actually delivers articles to the interior of the automobile or other motor vehicle for ultimate convenience in removing the articles from the hooded tray;

Sixth, to provide a means of this class having a hooded tray movable longitudinally of an extended track, which is angularly adjustable to the axis of the track, so that it may be laterally extended into contiguous relation with the side of an automobile body which is disposed at an acute angle to the axis of the track on which the hooded tray travels;

Seventh, to provide a means of this class which greatly facilitates the serving of patrons and saves considerable time and labor; and Eighth, to provide a means for marketing goods of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter set forth in detail and particularly set forth in the appended claims, reference being had to the accompanying drawings and to the characters of reference thereon forming a part of this application, in which:

Fig. 1 is a fragmentary top or plan view of my means for marketing goods; Fig. 2 is an enlarged fragmentary side elevational view taken from the line 2—2 of Fig. 1, showing the ordering microphone of said means; Fig. 3 is an enlarged fragmentary plan view of one of the tracks and hooded trays of my means for marketing goods; Fig. 4 is a fragmentary sectional view taken from the line 4—4 of Fig. 3; Fig. 5 is a fragmentary sectional view taken from the line 5—5 of Fig. 4; Fig. 6 is an enlarged fragmentary sectional view of the slide rail structure supporting the hooded tray of my means for marketing goods; Fig. 7 is a fragmentary plan view taken from the line 7—7 of Fig. 6 and Fig. 8 is a sectional view taken from the line 8—8 of Fig. 5.

Similar characters of reference refer to similar parts and portions throughout the several views of the drawings.

The conveyor frame 1, conveyor cable 2, sheaves 3 and 4, reversible motor 5, limit switches 6 and 7, rail bearing plate 8, slide plate 9, slide plate tracks 10 and 11, tray 12, hood 13, tray extension 14, hood weather strip 15, bearing plate swivel bolt 16, curtain 17, and microphone 18, constitute the principal parts and portions of my means for marketing goods.

The conveyor frame 1 is preferably constructed of standard galvanized pipe, or other similar material of non-corrosive character, and a plurality of these conveyor frames designated 1 are arranged as shown best in Fig. 1 of the drawings, wherein the inner ends thereof are disposed in adjacent, almost contiguous relationship to each other, while the outer ends are sufficiently spaced to permit the disposition of a vehicle, as illustrated by dash lines A, adjacent thereto, permitting a clerk to serve the inner ends of the conveyors by loading the hooded trays which are mechanically driven outwardly on the radially disposed conveyor frames 1 to the vehicles, all as shown best in Fig. 1 of the drawings. As shown in Figs. 3 to 5 of the drawings, each conveyor frame 1 is provided with opposed side rails 1a, preferably made of standard galvanized pipe, and these rails 1a are supported on vertical standards 1b, having the lower ends embedded in concrete or other suitable material, for maintaining the same in proper upright position. Engaging the rails 1a are the bearing sleeves 8a and 8b of the rail bearing plate 8. Positioned in a slotted portion at the upper side of each of these sleeves is a ball 8c, arranged to roll on the upper surface of the respective rail 1a. Each of these bearing sleeves is provided with a plate 8d, having a bearing plate swivel bolt 16 in connection therewith operating in an arcuate slot 8e in the bearing plate 8, to provide acute angular adjustment of the tray 12 on a vertical axis in order to accommodate misalignment of the side walls of motor vehicles parking adjacent the conveyor frames 1, as shown in Fig. 1 of the drawings. The slide plate 9 is slidably mounted in the channel-shaped slide rail tracks 10 and 11, laterally of the axis of the conveyor frame 1, as shown in Figs. 3 and 4 of the drawings, and it will be noted that the slide plate tracks 10 and 11 are fixed to the bearing plate 8, all as shown in detail in Fig. 4 of the drawings. Fixed to the upper side of the slide plate 9 is the tray 12, having the hood 13 supported thereon. This hood 13 is a box-like structure open at one side, and having the resilient weather strip 15 extending outwardly from the edge at the open side of said hood, all as shown best in Figs. 3 and 5 of the drawings. The open side of the hood 13 is provided with a rolled blind 17, which may be extended to enclose said open side of the hood 13 during adverse weather conditions. The tray extension 14 is slidable within the tray 12, and the opposite edges 14a thereof are retained by inwardly extending downwardly disposed edges 13a of the hood 13, all as shown best in Fig. 4 of the drawings. Thus, the tray extension 14 is adapted to be extended into the window of a motor vehicle, while the weather strip 15 is engaged in surrounding relation with the vehicle window frame, which engagement is accomplished by laterally sliding the tray 12 relative to the axis of the conveyor frame 1, by movement of the slide plate 9 in the slide plate tracks 10 and 11. Secured to the slide plate tracks 10 and 11 are opposite ends 2a and 2b, respectively, of the cable 2, which extends over the sheave 3 at one end of the conveyor frame 1, and over the sheave 4 at the opposite end of the conveyor frame 1. The sheave 4 is positioned on the shaft of the reversible motor 5, controlled by the limit switches 6 and 7, and the switch 18a, in connection with the microphone 18.

The operation of my means for marketing goods is substantially as follows: When a customer in a vehicle, as illustrated by dash lines A in Fig. 1 of the drawings, wishes to purchase goods from the counter B of the retail establishment C, he parks his car adjacent one of the conveyor frames 1, near the outer end thereof, substantially parallel thereto, and operates the switch 18a in connection with the microphone 18, and orally orders the goods desired. The clerk at the counter B fills the order from stock received from the main room of the retail establishment C, and places the same in one of the hooded trays 12, and during adverse weather conditions, the curtain 17 is extended downwardly to cover the open side of the hood 13, completely enclosing the goods from the elements. The clerk at the counter B then presses the switch 5a in connection with the motor 5, which is a reversible motor, causing the sheave 4 to move the cable 2, passing the same over the sheave 3, and conveying the tray 12 outwardly to a position at which it engages the limit switch 7, substantially coinciding with the location of the automobile, as indicated by dash lines A. As the tray 12 reaches the limit switch 7, it stops operation of the motor 5, and the customer and occupant of the vehicle A, simply reaches out and draws the tray 12 toward the window frame of the vehicle A by sliding the slide plate 9 in the slide plate tracks 10 and 11, as indicated in Fig. 1 of the drawings. The weather strip 15 is intimately engaged with the outer side of the vehicle body surrounding the window frame thereof, and acute angular relationship of the vehicle body relative to the conveyor frame 1 is compensated for by movement of the rail bearing plate 8 at the arcuate slotted portions 8e therein, about the bearing plate swivel bolts 16. In order to remove the goods from the tray 12 inwardly of the hood 13, the tray extension 14 is slidably moved outwardly of the hood 13, and extended beyond the outer edge of the tray 12, which places the articles originally disposed under the hood 13 totally within the body of the vehicle A, as indicated by dash lines A in Fig. 1 of the drawings. In this manner the tray extension 14 affords the ultimate convenience in removing the goods from the tray conveyed on the track frame 1 to the purchaser.

Though I have shown and described a particular construction, combination and arrangement of parts and portions, I do not wish to be limited to this particular construction, combination and arrangement of parts and portions, but desire to include in the scope of my invention the construction, combination and arrangement substantially as set forth in the appended claims.

Having thus described my invention, what I claim as new and desire to secure by Letters Patent is:

1. In a means of the class described, a conveyor, a tray movable longitudinally of said conveyor, means for moving said tray on said conveyor, said tray being slidable laterally of the axis of said conveyor and pivoted on a vertical axis, said tray provided with a hood thereover, enclosed on three sides and the top, and weather stripping of resilient material surrounding the open side of said hood.

2. In a means of the class described, a conveyor, a tray movable longitudinally of said conveyor, means for moving said tray on said conveyor, said tray being slidable laterally of the axis of said conveyor, said tray provided with a hood thereover, enclosed on three sides and the top, weather stripping of resilient material surrounding the open side of said hood, a tray extension movable within said hooded tray, and adapted to extend into the interior of a motor vehicle body through the window thereof.

3. In a means of the class described, a conveyor, a tray movable longitudinally of said conveyor, means for moving said tray on said conveyor, means for laterally sliding said tray relative to the axis of said conveyor, said tray sliding means comprising interfitting channel tracks, means for pivoting said tray about a vertical axis, said tray having an enclosed hood thereover, open on one side, a movable closure for the open side of said hood, adapted to enclose the same during adverse weather conditions.

4. In a means of the class described, a conveyor, a tray movable longitudinally of said conveyor, means for moving said tray on said conveyor, means for laterally sliding said tray relative to the axis of said conveyor, said tray being pivoted about a vertical axis, said tray having an enclosed hood thereover, open on one side, a curtain for the open side of said hood, adapted to enclose the same during adverse weather conditions, a tray extension slidably mounted within said hooded tray and extendable beyond said curtain and said tray.

5. In a means of the class described, a conveyor, a tray movable longitudinally of said conveyor, means for moving said tray on said conveyor, said tray slidable laterally of the axis of said conveyor, said tray provided with a hood thereover enclosed on three sides and the top, and weatherstripping of resilient material surrounding the open side of said hood at its edge portion.

KENNETH C. PURDY.

References Cited in the file of this patent

UNITED STATES PATENTS

| Number | Name | Date |
| --- | --- | --- |
| 726,903 | Gibson | May 5, 1903 |
| 1,459,628 | Hockaday | June 19, 1923 |
| 1,695,628 | Allen | Dec. 18, 1928 |
| 1,819,806 | Allen | Aug. 18, 1931 |
| 2,405,294 | Delucchi | Aug. 6, 1946 |